INVENTOR.
Walter C. Hanson

Patented Feb. 7, 1950

2,496,468

UNITED STATES PATENT OFFICE 2,496,468

DOUGHNUT CUTTING MACHINE

Walter C. Hanson, Fresno, Calif., assignor of one-half to David R. McKinley, Sacramento, Calif.

Application June 24, 1946, Serial No. 678,875

4 Claims. (Cl. 107—23)

This invention is directed to, and it is an object to provide, a commercial doughnut cutting machine operative, in combination with a conveyor belt on which a ribbon of dough is disposed, to cut such dough into the form of doughnuts preparatory to cooking the same.

Another object of the invention is to provide a doughnut cutting machine, as above, which includes a drum assembly having a plurality of doughnut cutting units on and projecting outwardly from the periphery thereof; the drum assembly being frictionally driven from the conveyor belt, and there being novel means functioning with rotation of said drum assembly to discharge the doughnuts from the cutting units after the latter run in engagement with said conveyor belt to cut and form such doughnuts.

An additional object of the invention is to provide a doughnut cutting machine, as in the preceding paragraph, wherein said means comprises doughnut pushout pins mounted in the drum assembly in position to work through the cutting units, and a cam mechanism operative to retract said pins prior to the cutting units engaging the ribbon of dough on the conveyor belt, and to advance said pins through the cutting units after each doughnut forming operation.

A further object of the invention is to produce an effective and practical device for the purpose for which it is designed.

These objects are accomplished by means of such structure and relative arrangement of parts as will fully appear by a perusal of the following specification and claims.

Referring now more particularly to the characters of reference on the drawings, the doughnut cutting machine comprises a horizontal shaft 1 supported in non-rotatable relation transversely above a conveyor belt 2 by means of upstanding standards 3. At opposite ends the shaft 1 is secured to the standards 3 by clamps 4.

Figure 1:
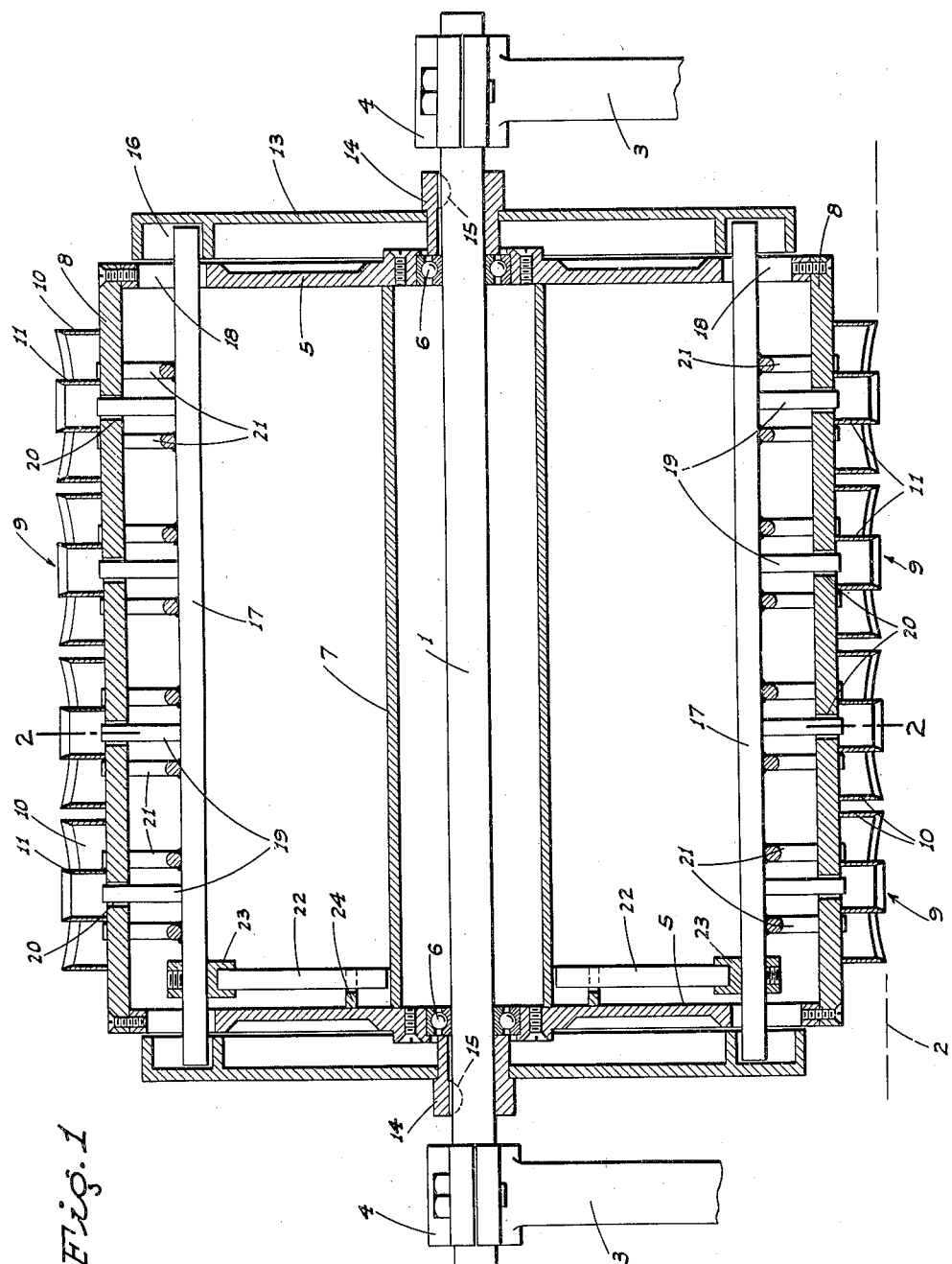
Fig. 1 is a longitudinal sectional elevation of the machine.
Figure 2:
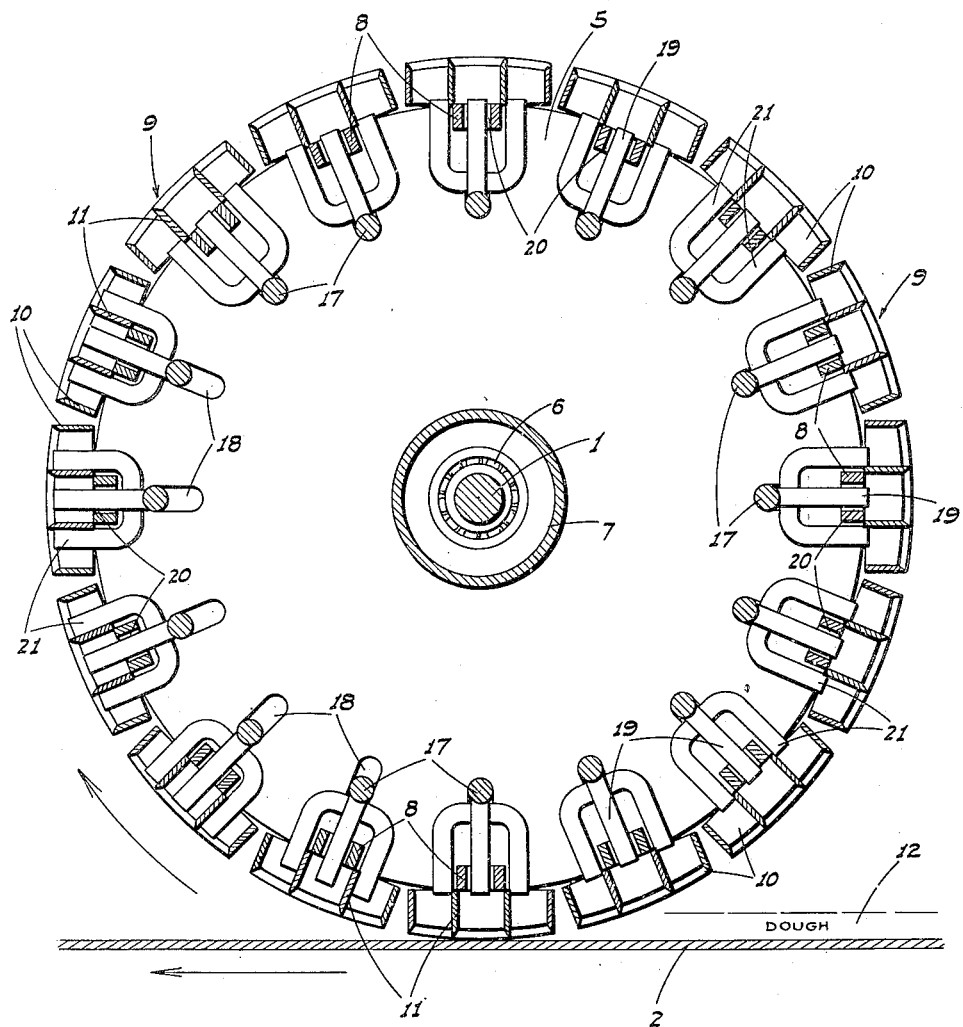
Fig. 2 is a cross section on line 2—2 of Fig. 1.
Figure 3:
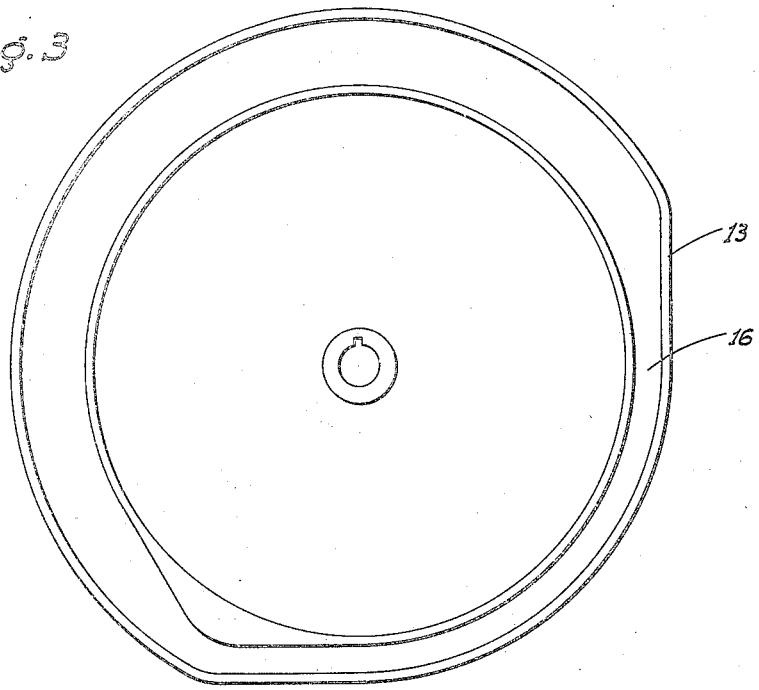
Fig. 3 is an elevation of one of the cam discs, detached.
Figure 4:
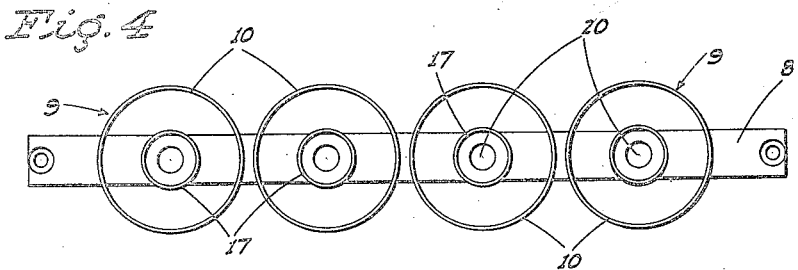
Fig. 4 is a plan view of one row of the doughnut cutting units, detached.
Figure 5:
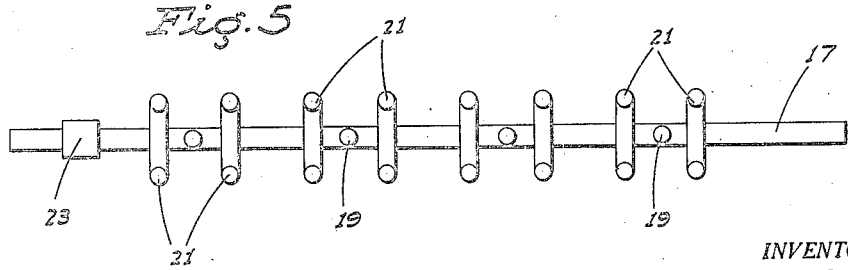
Fig. 5 is a plan view of one row of the pushout pins, detached.

A drum assembly is rotatably mounted on the fixed shaft 1 between the standards 3, and comprises a pair of relatively widely spaced circular end heads 5 turnably mounted on said shaft by bearings 6. The end heads 5 are connected together, in rigid relation, by a spacer sleeve 7 fixed to said heads in concentric surrounding relation to the shaft 1. At their peripheries the end heads 5 are connected by a plurality of circumferentially spaced, transversely extending, parallel bars 8, and each such bar carries a transverse row of doughnut cutting units, each of which is indicated generally at 9. Each of the doughnut cutting units 9 comprises an outside cutter ring 10 and a center cutter ring 11 of considerably lesser diameter disposed in concentric relation to the cutter ring 10. Both of the rings 10 and 11 of each cutting unit 9 are relatively sharp at their outer edges. The doughnut cutting units 9 project outwardly from the bars 8 a distance such that said units run, at the bottom of the drum assembly, in frictional engagement with the conveyor belt 2, whereby said drum assembly is driven in the direction indicated by the arrow in Fig. 2.

When the machine is in operation a ribbon or layer of dough 12 is fed to the conveyor belt 2 ahead of the doughnut cutting machine, and is engaged by the drum assembly as said ribbon passes thereunder. With passage of the ribbon of dough 12 beneath the drum assembly the cutting units 9, which are frictionally engaging the conveyor belt 2, cut through said ribbon to form the doughnuts.

The doughnuts as cut or formed by the units 10 tend to remain in the latter, but are discharged therefrom back onto the conveyor belt 2 by the following structural arrangement:

Axially outwardly of each end head 5 the machine includes a cam disc 13, each having a hub 14 keyed, as at 15, onto the shaft 1, whereby said cam discs 13 are non-rotatable. The cam discs 13 are each formed, adjacent the periphery thereof, with a laterally inwardly opening eccentric cam track or channel 16 of predetermined configuration. Rods 17 correspond to and are disposed radially inwardly of the bars 8, and said rods project, at the ends, through slots 18 in the end heads, and thence extend into the cam tracks.

In corresponding relation to each cutting unit 9 the adjacent rod 17 is fixed with the following doughnut pushout pin arrangement:

A center pushout pin 19 is fixed on the rod and projects through a bore 20 opening into the center cutter ring 11, while four symmetrically arranged pushout pins 21 extend in pairs on opposite sides of the adjacent bar 18 for movement through the outside cutter ring 10, the latter being of substantially greater diameter than the width of the bar 8, whereby the pushout pins 21 can be disposed as claimed. The pushout pins 21 for each cutting unit 9 are in the form of two U-shaped members secured to the corresponding rod 17 on opposite sides of the center pushout pin 19 and straddling the adjacent bar 8.

Rotation of the rods 17 is prevented by radial guide rods 22 extending from collars 23 fixed on the rods 17; said guide rods 22 projecting inwardly in slidable relation through guide ears 24 on the inner face of one of the circular end heads 5.

The configuration of the cam tracks 16 is such that the rods 17, together with the pushout pins 19 and 21, are retracted in advance of the cutting units 9 engaging the ribbon of dough 12, and are held so retracted until the doughnuts have been cut. Thereafter, and as the cutting units 9 begin to rise away from the conveyor belt 2, the cam tracks 16 act on the rods 17 to advance the pins 19 and 21 through the cutting units 9 so as to discharge the formed doughnuts, which then fall back onto the conveyor belt 2. At a following point on said conveyor belt 2 the doughnuts, and trimmings, are separated by hand.

With the described doughnut cutting machine, doughnuts may be cut or formed commercially in a practical, speedy, and effective manner, the machine being of such construction that it requires a minimum of maintenance or repair, and can be readily cleaned preparatory to, or after, use.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A doughnut cutting machine comprising a supported shaft, a pair of spaced apart circular end heads mounted for rotation on the shaft, a plurality of circumferentially spaced apart parallel bars fixed to the peripheries of the end heads and extending between said heads, a plurality of doughnut cutting units mounted on each bar, each such cutting unit comprising a cutter ring fixed to the face of the adjacent bar and such ring being of a diameter to project to each side thereof to leave open spaces between the side edges of the bar and the inner periphery of the cutter ring, and a dough conveyor belt disposed tangentially of the periphery of the machine, groups of push out pins, the pins of each such group straddling the bar from the back and being so positioned relative to the cutter rings that when reciprocated they will move through the cutter rings, and means to reciprocate such groups of push out pins.

2. A cutting machine as in claim 1 in which the push out pins are spaced from the inner peripheries of the cutter rings.

3. A doughnut cutting machine comprising a supported shaft, a pair of spaced apart circular end heads mounted for rotation on the shaft, a plurality of circumferentially spaced apart parallel bars fixed to the peripheries of the end heads and extending between said heads, a plurality of doughnut cutting units mounted on each bar, each such cutting unit comprising a cutter ring fixed to the face of the adjacent bar and such ring being of a diameter to project to each side thereof to leave open spaces between the side edges of the bar and the inner periphery of the cutter ring, and a dough conveyor belt disposed tangentially of the periphery of the machine, a rod disposed parallel to each bar and spaced therefrom inwardly toward said shaft, means to reciprocate said rods toward and away from the bars, and a group of spaced apart push out pins fixed to the rods adjacent each cutter ring, such fingers straddling the adjacent bar and projecting into the adjacent cutter ring.

4. A machine as in claim 3, including a radial guide member on each of said rods, guide ears on the end heads, each guide member projecting through one of said guide ears in sliding relation thereto, whereby the rods will rotate with the heads while allowing such reciprocation thereof.

WALTER C. HANSON.

REFERENCES CITED

The following references are of record in the file of this patent:

UNITED STATES PATENTS

| Number | Name | Date |
|---|---|---|
| 29,295 | Marsh | July 24, 1860 |
| 870,249 | Patterson | Nov. 5, 1907 |
| 1,656,590 | Longstreth et al. | Jan. 17, 1928 |
| 1,945,755 | Scruggs | Feb. 6, 1934 |

FOREIGN PATENTS

| Number | Country | Date |
|---|---|---|
| 11,128 | Great Britain | June 30, 1891 |